(12) United States Patent
Kurematsu et al.

(10) Patent No.: US 11,761,496 B2
(45) Date of Patent: Sep. 19, 2023

(54) CAM CLUTCH

(71) Applicant: TSUBAKIMOTO CHAIN CO., Osaka (JP)

(72) Inventors: Yuji Kurematsu, Osaka (JP); Tsubasa Sugiya, Osaka (JP); Eiichi Nakagawa, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 0 days.

(21) Appl. No.: 18/106,742

(22) Filed: Feb. 7, 2023

(65) Prior Publication Data

US 2023/0250855 A1    Aug. 10, 2023

(30) Foreign Application Priority Data

Feb. 10, 2022    (JP) .................................. 2022-019855

(51) Int. Cl.
*F16D 41/07* (2006.01)
*F16D 41/08* (2006.01)

(52) U.S. Cl.
CPC ......... *F16D 41/076* (2013.01); *F16D 41/084* (2013.01)

(58) Field of Classification Search
CPC .............................. F16D 41/076; F16D 41/084
See application file for complete search history.

(56) References Cited

U.S. PATENT DOCUMENTS

| | | | | |
|---|---|---|---|---|
| 2,427,120 A | * | 9/1947 | Blair | F16D 41/084 |
| | | | | 192/43 |
| 5,343,992 A | * | 9/1994 | Stark | F16D 41/061 |
| | | | | 192/93 C |
| 9,212,707 B2 | * | 12/2015 | Kato | F16D 41/07 |
| 2022/0056963 A1 | | 2/2022 | Nakagawa et al. | |

FOREIGN PATENT DOCUMENTS

JP    6882699 B2    6/2021

* cited by examiner

*Primary Examiner* — Huan Le
(74) *Attorney, Agent, or Firm* — WHDA, LLP

(57) ABSTRACT

To provide a simple-structured cam clutch that does not require precise control, uses a smaller drive force for forcibly changing cam postures, and provides improved clutch operation stability and high responsiveness. The cam clutch includes a plurality of cams circumferentially arranged between an inner race and an outer race and supported by a cage member, and a selector allowing a rotation angle thereof to be controlled relatively to the inner race or the outer race to which the cage member is fixed. The selector has a cam posture control surface in contact with cam surfaces of the cams and capable of causing the cams to change posture thereof. The cam posture control surface includes a cam release portion radially protruded toward the cams more than a cam actuator portion and causing the cams to change posture thereof to a non-operating posture.

4 Claims, 5 Drawing Sheets

CAM CLUTCH

BACKGROUND OF THE INVENTION

1. Field of the Invention

The present invention relates to a cam clutch configured to be switchable between a free state that allows relative rotation between an outer race and an inner race and a locked state that prohibits relative rotation between the outer race and the inner race.

2. Description of the Related Art

As a cam clutch for controlling transmission and interruption of a rotary force, a cam clutch is known that implements switching between a locked state, which prohibits relative rotation between an inner race and an outer race (transmitting the rotary force), and a free state, which allows relative rotation between the inner race and the outer race (interrupting the rotary force), by forcibly changing postures of cams or sprags.

Japanese Patent No. 6882699, for example, discloses a cam clutch, which has a cam posture change part including a plurality of pin members as means of forcibly tilting a plurality of cams circumferentially arranged between the inner race and the outer race, and which forcibly changes cam postures as the pin members move in the circumferential direction relative to the cams and press the sides of the cams in the circumferential direction.

SUMMARY OF THE INVENTION

Such a cam clutch requires a large drive force when switching from a locked state to a free state to change the posture of cams in a state where torque transmission is in progress by the cams, and this raises concern that the switching may not be completed until the torque transmission is fully implemented.

Moreover, the raceways of the inner and outer races could suffer damage, and a larger mechanism for changing the cam posture and a larger actuator are needed in accordance with the drive force.

The cam clutch known from Japanese Patent No. 6882699 is highly responsive and can provide a desired torque capacity. With the pin members located away from the pivot point of the pins, a relatively large drive force can be generated for changing the cam posture. On the other hand, the pins need to be positioned precisely relative to each other, and also, the rotation angle of the cam posture change part needs to be controlled precisely when changing the posture of the cams.

The present invention solves these problems, and aims to provide a simple-structured cam clutch that does not require precise control, uses a smaller drive force for forcibly changing cam postures, and provides improved clutch operation stability and high responsiveness.

The present invention achieves the above object by providing a cam clutch including: an inner race and an outer race that are provided coaxially and relatively rotatably; a plurality of cams circumferentially arranged between the inner race and the outer race; a cage member fixed rotationally to the inner race or the outer race and supporting the plurality of cams; and a selector allowing a rotation angle thereof to be controlled relatively to the inner race or the outer race to which the cage member is fixed, and having a cam posture control surface in contact with cam surfaces of the cams and capable of causing the cams to change posture thereof, the cam posture control surface including a cam actuator portion causing the cams to perform an ordinary operation, and a cam release portion radially protruded toward the cams more than the cam actuator portion and causing the cams to change posture thereof to a non-operating posture.

According to the invention set forth in claim 1, the cam posture control surface can make contact with cam surfaces and change the posture of the cams, and includes a cam actuator portion, and a cam release portion radially protruded toward the cams more than the cam actuator portion and causing the cams to change their posture to a non-operating posture. The cam posture control surface can free the cams from an operating state wherever there is the cam release portion, so that it need not be precisely positioned for each of the plurality of cams, and also the rotation angle of the selector need not be controlled precisely.

Since the cam clutch requires a smaller drive force for forced change of cam postures, the components and actuator for the switching can be made smaller and producible more inexpensively. The smaller drive force also means improved clutch operation stability and higher responsiveness. Moreover, the durability will be improved because the raceways of the inner race and outer race suffer less damage.

The switching is achieved by the selector riding over the end face of the cams, so that the switching angle of the selector need not be controlled precisely and can be made large, which enables reliable switching operation free of various dimensional tolerances or control errors.

According to the invention set forth in claim 2, the cam surfaces able to make contact with the cam posture control surface of the selector are configured to also make contact with either an outer circumferential surface of the inner race or an inner circumferential surface of the outer race at different positions in a direction of rotation axis of the cam surfaces. This reduces the torque being transmitted that is applied to the selector in the locked state. Therefore the selector structure can be made simpler, which will improve the durability further.

According to the invention set forth in claim 3, the cam clutch further includes a spacer member disposed between the inner race and the outer race so as to keep a distance between an outer circumferential surface of the inner race and an inner circumferential surface of the outer race. The spacer member can provide a centering function so that other bearing members can be omitted and the cam clutch can be made more compact in the axial direction. The inner race and outer race having their centers precisely matching each other can reduce variation in the operation of the plurality of cams, so that the stability of the clutch operation will improve further.

According to the invention set forth in claim 4, a plurality of sets of the inner race, outer race, cams, and cage member are provided along a direction of rotation axis, with the selector being interposed between the sets, and the selector has a cam posture control surface for the cams on both sides of the direction of rotation axis. With a single selector capable of controlling the operation of the cam clutches on both sides by being driven to respective rotated positions, the cam clutch can be switched between multiple states by a simple configuration.

DESCRIPTION OF THE PREFERRED EMBODIMENTS

Embodiments of the present invention are described with reference to FIG. 1 to FIG. 9. Note, however, the present invention is not limited to these embodiments.

Embodiment 1

Figure 1:
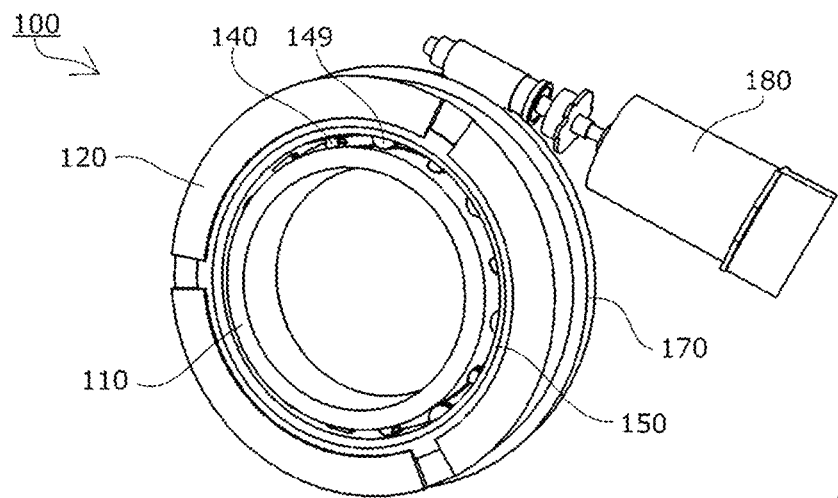
FIG. 1 is a perspective view of a cam clutch according to a first embodiment of the present invention.
Figure 2:
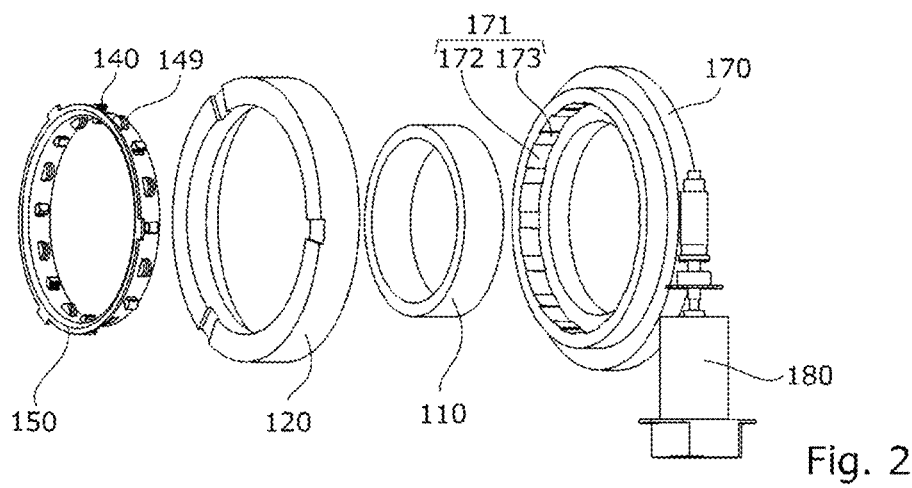
FIG. 2 is an exploded perspective view of the cam clutch shown in FIG. 1.
Figure 3:
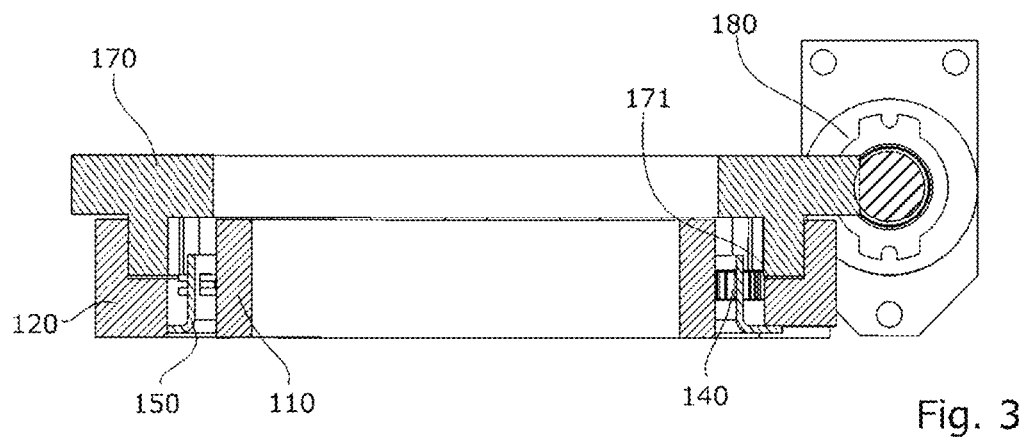
FIG. 3 is a cross-sectional view of the cam clutch shown in FIG. 1.

The cam clutch 100 according to a first embodiment of the present invention includes, as shown in FIG. 1 to FIG. 3, an inner race 110 and an outer race 120 that are provided coaxial and rotatable relative to each other, a plurality of cams 140 that transmit and interrupt power between the inner race 110 and the outer race 120, a cage member 150 that is fixed rotationally to the outer race 120 and supports the plurality of cams 140, and a selector 170 allowing a rotation angle thereof to be controlled relatively to the outer race 120 and having a cam posture control surface 171 in contact with cam surfaces of the cams 140 and capable of causing the cams 140 to change their posture.

The cam clutch further includes a plurality of rollers 149 as spacer members between the inner race 110 and the outer race 120, disposed such as to roll on the outer circumferential surface of the inner race 110 and on the inner circumferential surface of the outer race 120. The cage member 150 supports each of the plurality of cams 140 and the plurality of rollers 149 on the same circumference at predetermined circumferential intervals.

The spacer members may be block members disposed such as to make sliding contact with the outer circumferential surface of the inner race 110 and the inner circumferential surface of the outer race 120. The spacer members may be fixed to the cage member 150, or may be formed integrally to the cage member 150.

The cam posture control surface 171 includes a cam actuator portion 172 causing the cams 140 to perform an ordinary operation, and a cam release portion 173 radially protruded toward the cams 140 more than the cam actuator portion 172 and causing the cams 140 to change their posture to a non-operating posture.

In this embodiment, the cams 140 are configured such that the cam surface facing the outer race 120 makes contact with the inner circumferential surface of the outer race 120 in substantial part along a direction of rotation axis, and makes contact with the cam posture control surface 171 of the selector 170 in part along the direction of rotation axis.

The selector 170 is driven by an actuator 180 to rotate and configured to allow its rotation angle to be controlled relatively to the outer race 120.

In this cam clutch 100, the cage member 150 is fixed to the outer race 120.

The cams 140 are disposed such that the cam surface on the radially inner side entirely faces the outer circumferential surface of the inner race 110, the cam surface on the radially outer side partly faces the cam posture control surface 171 of the selector 170, and the cam surface on the radially outer side mostly faces the inner circumferential surface of the outer race 120.

The actuator 180 that drives the selector 170 to rotate relative to the outer race 120 is fixed to a stationary portion (not shown) so that the rotation angle of the selector 170 relative to the outer race 120 is controlled by the actuator 180.

The cam clutch 100 according to this embodiment is switched between a free state that allows relative rotation between the inner race 110 and outer race 120 and a locked state that prohibits relative rotation between the inner race 110 and outer race 120 by a change in the rotation angle of the selector 170.

The cam posture control surface 171 of the selector 170 includes a cam actuator portion 172 that is either a surface coplanar with the inner circumferential surface of the outer race 120 or a surface positioned radially on the outer side thereof, and a cam release portion 173 radially protruded toward the cams more than the cam actuator portion 172 and positioned on the radially inner side of the inner circumferential surface of the outer race 120.

With the cam surface of the cams 140 on the radially outer side facing each cam actuator portion 172, the cams 140 operate as those of an ordinary one-way cam clutch between the outer circumferential surface of the inner race 110 and the inner circumferential surface of the outer race 120.

With the cam surface of the cams 140 on the radially outer side facing each cam release portion 173, the cams 140 are locked to a posture in which they do not wedge between the outer circumferential surface of the inner race 110 and the inner circumferential surface of the outer race 120, so that the inner race 110 is allowed to freely rotate in both directions relative to the outer race 120.

Embodiment 2

Figure 4:
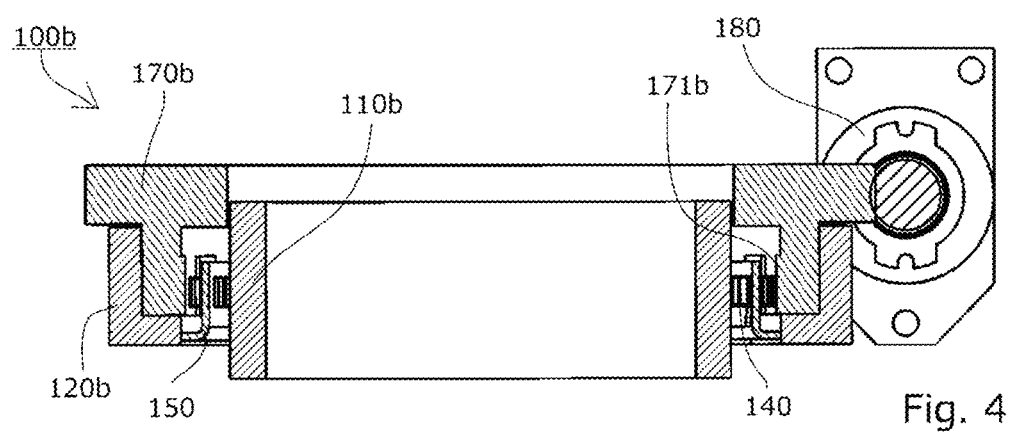
FIG. 4 is a cross-sectional view of a cam clutch according to a second embodiment of the present invention.

In the cam clutch 100b according to a second embodiment of the present invention, as shown in FIG. 4, the cams 140 are configured such that their cam surface facing the outer race 120b makes contact with the cam posture control surface 171b of the selector 170b entirely along the direction of rotation axis and does not contact the inner circumferential surface of the outer race 120b.

Other configurations of the cam clutch are similar to those of the first embodiment.

In this embodiment, since the cam surface of the cams 140 facing the outer race 120b makes contact with the cam posture control surface 171b of the selector 170b entirely along the direction of rotation axis, the posture of the cams 140 can be changed to a free state in a reliable manner.

Since the cam posture control surface 171b of the selector 170b serves as the torque transmission surface in the locked state, the cam posture is changed by moving the torque transmission surface itself in the switching to the free state, and therefore the switching is performed reliably even when torque is being applied.

Embodiment 3

Figure 5:
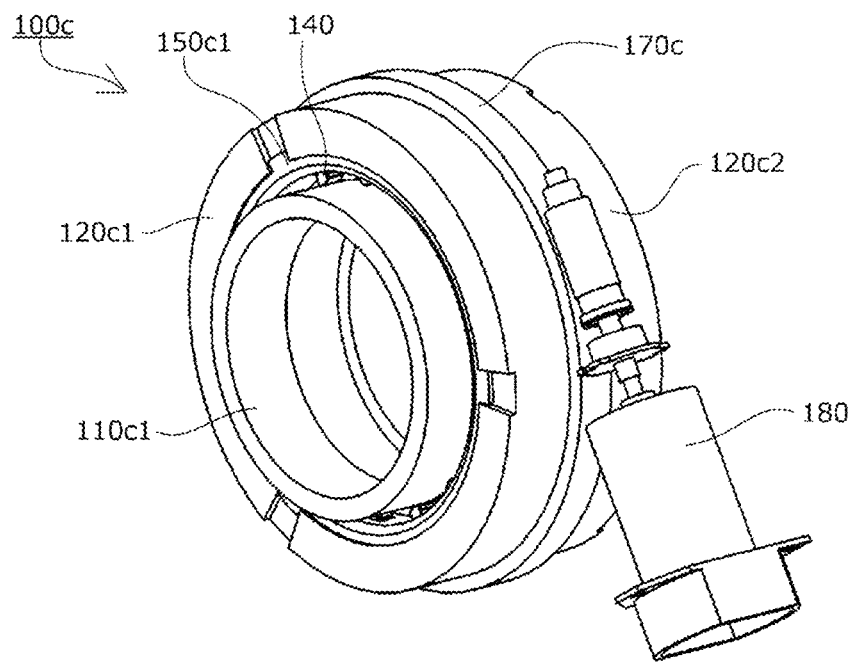
FIG. 5 is a perspective view of a cam clutch according to a third embodiment of the present invention.
Figure 6:
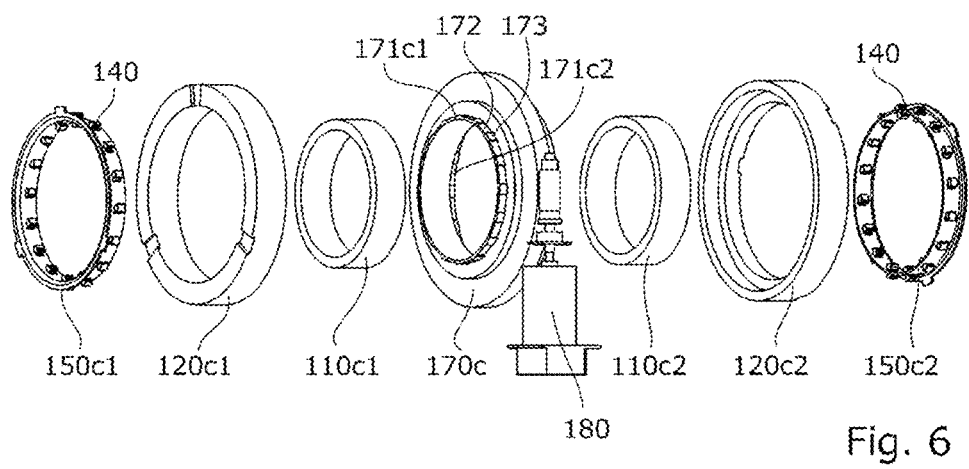
FIG. 6 is an exploded perspective view of the cam clutch shown in FIG. 5.
Figure 7:
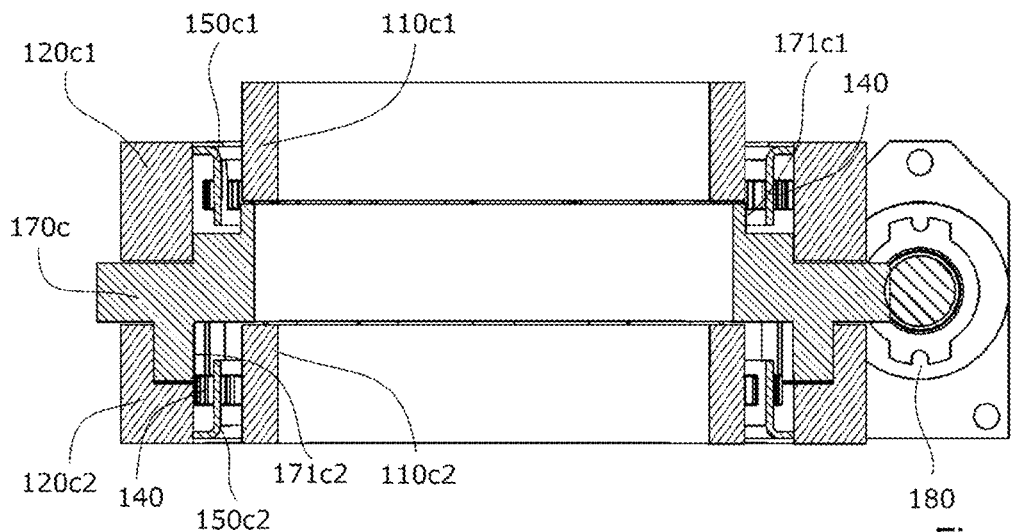
FIG. 7 is a cross-sectional view of the cam clutch shown in FIG. 5.

The cam clutch 100c according to a third embodiment of the present invention includes, as shown in FIG. 5 to FIG. 7, two sets of inner races 110c1 and 110c2 and outer races 120c1 and 120c2 that are coaxial and rotatable relative to each other, a plurality of cams 140 that transmit and interrupt power between the inner race 110c1 and the outer race 120c1 and between the inner race 110c2 and the outer race 120c2, a cage member 150c1 that is fixed rotationally to the outer race 120c1 and supports the plurality of cams 140, a cage member 150c2 that is fixed rotationally to the outer race 120c2 and supports the plurality of cams 140, and a selector 170c, disposed between the outer races 120c1 and 120c2, and allowing a rotation angle thereof to be controlled relatively to the outer races 120c1 and 120c2, and moreover having cam posture control surfaces 171c1 and 171c2 in contact with the cam surfaces of the cams 140 and capable of causing the cams 140 to change their posture.

Optionally, a plurality of rollers or spacers may be disposed between the inner race 110c1 and the outer race 120c1 and between the inner race 110c2 and the outer race 120c2, similarly to the first embodiment.

The cam posture control surfaces 171c1 and 171c2 each include a cam actuator portion 172 causing the cams 140 to perform an ordinary operation, and a cam release portion 173 radially protruded toward the cams 140 more than the cam actuator portion 172 and causing the cams 140 to change their posture to a non-operating posture.

In this embodiment, the cams 140 disposed between the inner race 110c1 and the outer race 120c1 are configured such that the cam surface facing the inner race 110c1 makes contact with the outer circumferential surface of the inner race 110c1 in substantial part along a direction of rotation axis, and makes contact with the cam posture control surface 171c1 of the selector 170c in part along the direction of rotation axis.

The cams 140 disposed between the inner race 110c2 and the outer race 120c2 are configured such that the cam surface facing the outer race 120c2 makes contact with the inner circumferential surface of the outer race 120c2 in substantial part along the direction of rotation axis, and makes contact with the cam posture control surface 171c2 of the selector 170c in part along the direction of rotation axis similarly to the first embodiment.

The selector 170c is driven by an actuator 180 to rotate and configured to allow its rotation angle to be controlled relatively to the outer races 120c1 and 120c2.

In this cam clutch 100c, the cage member 150c1 is fixed to the outer race 120c1, and the cage member 150c2 is fixed to the outer race 120c2.

The cams 140 disposed between the inner race 110c1 and the outer race 120c1 have the cam surface on the radially outer side entirely facing the inner circumferential surface of the outer race 120c1, the cam surface on the radially inner side partly facing the cam posture control surface 171c1 of the selector 170c, and the cam surface on the radially inner side mostly facing the outer circumferential surface of the inner race 110c1.

The cams 140 disposed between the inner race 110c2 and the outer race 120c2 have the cam surface on the radially inner side entirely facing the outer circumferential surface of the inner race 110c2, the cam surface on the radially outer side partly facing the cam posture control surface 171c2 of the selector 170c, and the cam surface on the radially outer side mostly facing the inner circumferential surface of the outer race 120c2.

The cams 140 between the inner race 110c1 and the outer race 120c1 and the cams 140 between the inner race 110c2 and the outer race 120c2 are disposed such as to each configure a one-way clutch, rotation being locked in opposite directions.

The actuator 180 that drives the selector 170c to rotate relative to the outer races 120c1 and 120c2 is fixed to a stationary portion (not shown) so that the rotation angle of the selector 170c relative to the outer races 120c1 and 120c2 is controlled by the actuator 180.

Figure 8:
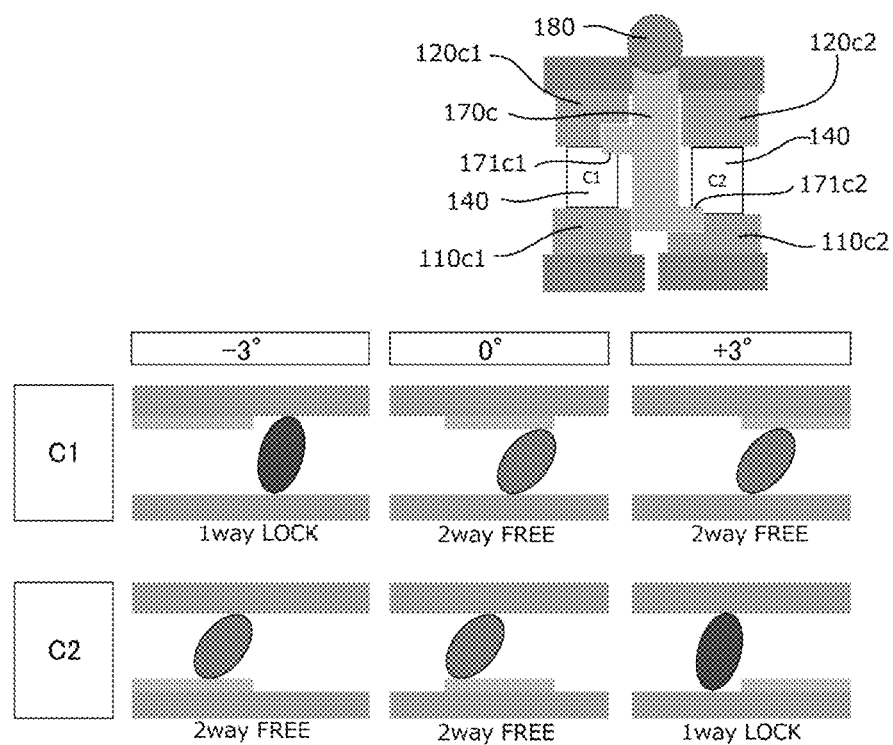
FIG. 8 is a diagram explaining the operation of the cam clutch according to the third embodiment of the present invention.

The cam clutch 100c according to this embodiment is configured to be switched, by means of the actuator 180, between one and another of a two-way free state (with the selector 170c being at the neutral position 0°) in which relative rotation between the inner race 110c1 and the outer race 120c1 and relative rotation between the inner race 110c2 and the outer race 120c2 are both allowed, a first locked state (with the selector 170c being rotated −3° from the neutral position) in which relative rotation between the inner race 110c1 and the outer race 120c1 is prohibited while relative rotation between the inner race 110c2 and the outer race 120c2 is allowed, and a second locked state (with the selector 170c being rotated +3° from the neutral position) in which relative rotation between the inner race 110c2 and the outer race 120c2 is prohibited while relative rotation between the inner race 110c1 and the outer race 120c1 is allowed, as shown in FIG. 8.

The cam posture control surface 171c1 of the selector 170c includes a cam actuator portion that is either a surface coplanar with the outer circumferential surface of the inner race 110c1 or a surface positioned radially on the inner side thereof, and a cam release portion 173c1 radially protruded toward the cams more than the cam actuator portion and positioned on the radially outer side of the outer circumferential surface of the inner race 110c1.

With the cam surface of the cams 140 on the radially inner side facing each cam actuator portion, the cams 140 operate as those of an ordinary one-way cam clutch between the outer circumferential surface of the inner race 110c1 and the inner circumferential surface of the outer race 120c1.

With the cam surface of the cams 140 on the radially inner side facing each cam release portion, the cams 140 are locked to a posture in which they do not wedge between the outer circumferential surface of the inner race 110c1 and the inner circumferential surface of the outer race 120c1, so that the inner race 110c1 is allowed to freely rotate in both directions relative to the outer race 120c1.

The cam posture control surface 171c2 of the selector 170c includes a cam actuator portion that is either a surface coplanar with the inner circumferential surface of the outer race 120c2 or a surface positioned radially on the outer side thereof, and a cam release portion radially protruded toward the cams more than the cam actuator portion and positioned on the radially inner side of the inner circumferential surface of the outer race 120c2.

With the cam surface of the cams 140 on the radially outer side facing each cam actuator portion, the cams 140 operate as those of an ordinary one-way cam clutch between the outer circumferential surface of the inner race 110c2 and the inner circumferential surface of the outer race 120c2.

With the cam surface of the cams 140 on the radially outer side facing each cam release portion, the cams 140 are locked to a posture in which they do not wedge between the outer circumferential surface of the inner race 110c2 and the inner circumferential surface of the outer race 120c2, so that the inner race 110c2 is allowed to freely rotate in both directions relative to the outer race 120c2.

While embodiments of the present invention have been described in detail, the present invention is not limited to the above-described embodiments and may be carried out with various design changes without departing from the scope of the present invention set forth in the claims.

While the actuator 180 illustrated in the embodiments described above is supposed to be a motor with a worm drive that engages with the outer periphery of the selector 170, 170b, or 170c, the actuator may have any configuration as long as it drives the selector 170, 170b, or 170c to rotate relative to the outer race 120, 120b, 120c1, or 120c2.

Figure 9:
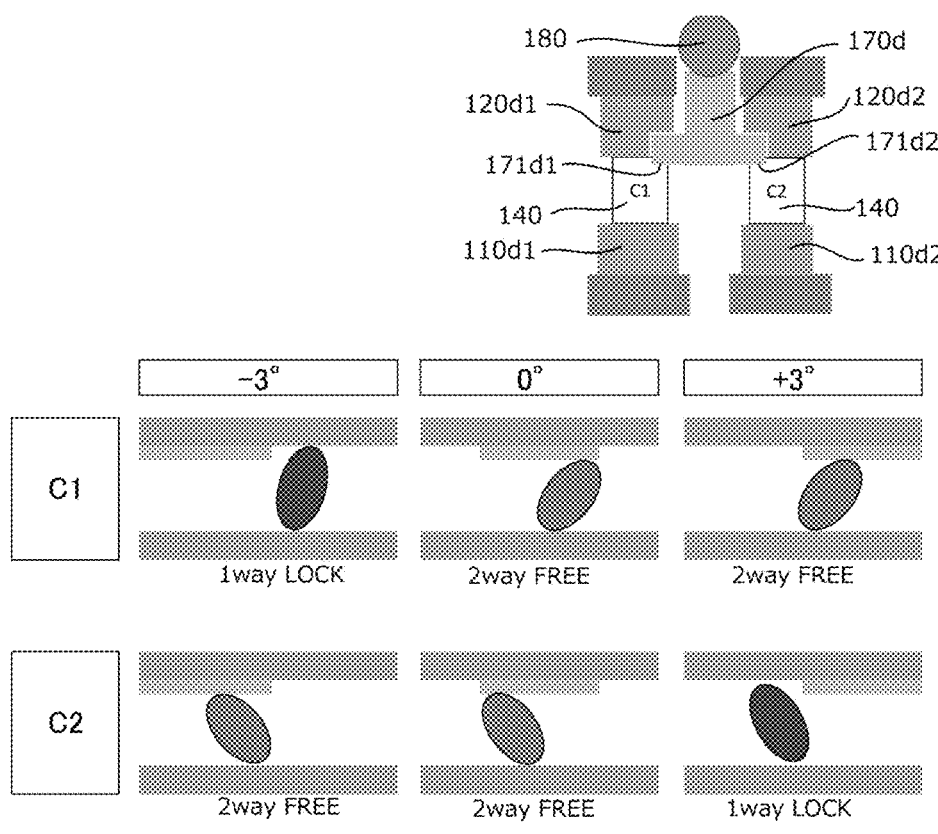
FIG. 9 is a diagram explaining the operation of a cam clutch according to a modified example of the third embodiment of the present invention.

In a variation example of the third embodiment, as shown in FIG. 9, the selector 170d may have both cam posture control surfaces 171d1 and 171d2 that can change the posture of the cams 140, such as to face the outer races 120d1 and 120d2 respectively. Alternatively, both cam posture control surfaces may be disposed such as to face the inner races.

What is claimed is:

1. A cam clutch comprising:
   an inner race and an outer race that are provided coaxially and relatively rotatably;
   a plurality of cams circumferentially arranged between the inner race and the outer race;
   a cage member fixed rotationally to the inner race or the outer race and supporting the plurality of cams; and
   a selector allowing a rotation angle thereof to be controlled relatively to the inner race or the outer race to which the cage member is fixed rotationally, and having a cam posture control surface in contact with cam surfaces of the cams and capable of causing the cams to change posture thereof,
   the cam posture control surface including a cam actuator portion causing the cams to perform an ordinary operation, and a cam release portion radially protruded toward the cams more than the cam actuator portion and causing the cams to change posture thereof to a non-operating posture.

2. The cam clutch according to claim 1, wherein the cam surfaces able to make contact with the cam posture control surface of the selector are configured to also make contact with either an outer circumferential surface of the inner race or an inner circumferential surface of the outer race at different positions in a direction of rotation axis of the cam surfaces.

3. The cam clutch according to claim 1, comprising a spacer member disposed between the inner race and the outer race so as to keep a distance between the outer circumferential surface of the inner race and the inner circumferential surface of the outer race.

4. The cam clutch according to claim 1, comprising a plurality of sets of the inner race, the outer race, the plurality of cams, and the cage member along a direction of rotation axis, with the selector being interposed between the sets,
   the selector having the cam posture control surface for the cams on both sides in the direction of rotation axis.

* * * * *